(12) United States Patent
Rho et al.

(10) Patent No.: US 9,019,453 B2
(45) Date of Patent: *Apr. 28, 2015

(54) LIQUID CRYSTAL DISPLAY

(75) Inventors: Soon Joon Rho, Suwon-si (KR); Jun Ha Park, Anyang-si (KR); Jihong Bae, Yongin-si (KR); Hyelim Jang, Yongin-si (KR); Hyeokjin Lee, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,900

(22) Filed: Sep. 10, 2012

(65) Prior Publication Data

US 2013/0215341 A1     Aug. 22, 2013

(30) Foreign Application Priority Data

Feb. 22, 2012  (KR) .................. 10-2012-0018064

(51) Int. Cl.
| | | |
|---|---|---|
| *G02F 1/13357* | (2006.01) | |
| *G02F 1/1337* | (2006.01) | |
| *G02F 1/1343* | (2006.01) | |
| G02F 1/1362 | (2006.01) | |
| G02F 1/137 | (2006.01) | |

(52) U.S. Cl.
CPC ...... *G02F 1/134309* (2013.01); *G02F 1/13624* (2013.01); *G02F 2001/134318* (2013.01); *G02F 2001/134345* (2013.01); *G02F 2001/13712* (2013.01)

(58) Field of Classification Search
CPC ............... G02F 1/13624; G02F 2001/134318; G02F 2001/13712
USPC ............ 428/1.1, 1.2; 349/15, 123, 139
See application file for complete search history.

(56) References Cited

U.S. PATENT DOCUMENTS

| | | |
|---|---|---|
| 6,115,100 A | 9/2000 | Koma |
| 2003/0048401 A1 | 3/2003 | Hanaoka et al. |
| 2005/0099564 A1 | 5/2005 | Wang et al. |
| 2010/0149478 A1 | 6/2010 | Lee et al. |
| 2013/0114030 A1* | 5/2013 | Seong et al. .............. 349/123 |

FOREIGN PATENT DOCUMENTS

| | | |
|---|---|---|
| JP | 09-090434 | 4/1997 |
| JP | 11-153814 | 6/1999 |
| JP | 2007-047460 | 2/2007 |
| JP | 2009-031437 | 2/2009 |
| JP | 2010-008597 | 1/2010 |
| JP | 2010-215609 | 9/2010 |
| KR | 10-2005-0029523 A | 3/2005 |
| KR | 10-2008-0095119 A | 10/2008 |
| KR | 10-2010-0047570 A | 5/2010 |
| KR | 10-2012-0050645 A | 5/2012 |
| KR | 1020120124012 A | 11/2012 |

* cited by examiner

*Primary Examiner* — Geraldina Visconti
(74) *Attorney, Agent, or Firm* — Innovation Counsel LLP

(57) ABSTRACT

A liquid crystal display includes a plurality of pixels, a first substrate, a second substrate, and a liquid crystal layer disposed between the first and second substrates. The first substrate includes a first base substrate and a pixel electrode provided on the first base substrate to correspond to each of the pixels. The second substrate includes a second base substrate facing the first base substrate and a common electrode provided on the second base substrate. The common electrode forms an electric field having an equipotential surface substantially parallel to an upper surface of the first base substrate in cooperation with the pixel electrode. The liquid crystal layer is disposed between the pixel electrode and the common electrode and includes a liquid crystal composition having an anisotropic dielectric constant equal to or smaller than −2.9 and equal to or larger than −1.7.

18 Claims, 12 Drawing Sheets

LIQUID CRYSTAL DISPLAY

CROSS-REFERENCE TO RELATED APPLICATION

This U.S. non-provisional patent application claims priority under 35 U.S.C. §119 of Korean Patent Application No. 10-2012-0018064, filed on Feb. 22, 2012, the contents of which are hereby incorporated by reference.

BACKGROUND

1. Field of Disclosure

The present disclosure relates to a liquid crystal display. More particularly, the present disclosure relates to a liquid crystal display having a fast response speed.

2. Description of the Related Art

In general, liquid crystal displays includes a first substrate on which a plurality of pixel electrodes are disposed, a second substrate on which a common electrode is disposed, and a liquid crystal layer disposed between the first and second substrates. The liquid crystal display controls transmittance of light passing through the liquid crystal layer according to an electric field generated between the common electrode and the pixel electrodes. The liquid crystal display includes a plurality of pixels each having a pixel electrode.

Currently, the liquid crystal displays are being developed to display three-dimensional images. To realize the three-dimensional image on the liquid crystal display, a large amount of image information is required to be provided to a viewer, more than is required when only a two-dimensional image is displayed. That is, the pixel is required to be operated at a fast speed.

SUMMARY

The present disclosure provides a liquid crystal display having a fast response speed.

A liquid crystal display includes a plurality of pixels, a first substrate, a second substrate, and a liquid crystal layer disposed between the first and second substrates.

The first substrate includes a first base substrate and a pixel electrode provided on the first base substrate to correspond to each of the pixels. The second substrate includes a second base substrate facing the first base substrate and a common electrode provided on the second base substrate, and the common electrode forms an electric field having an equipotential surface substantially parallel to an upper surface of the first base substrate in cooperation with the pixel electrode. The liquid crystal layer is disposed between the pixel electrode and the common electrode and includes a liquid crystal composition having an anisotropic dielectric constant equal to or smaller than −2.9 and equal to or larger than −1.7.

The liquid crystal composition includes at least one first liquid crystal selected from the group consisting of compounds represented by the following Chemical formula 1, at least one second liquid crystal selected from the group consisting of compounds represented by the following Chemical formula 2, at least one third liquid crystal selected from the group consisting of compounds represented by the following Chemical formula 3, at least one fourth liquid crystal selected from the group consisting of compounds represented by the following Chemical formula 4, and at least one fifth liquid crystal selected from the group consisting of compounds represented by the following Chemical formula 5.

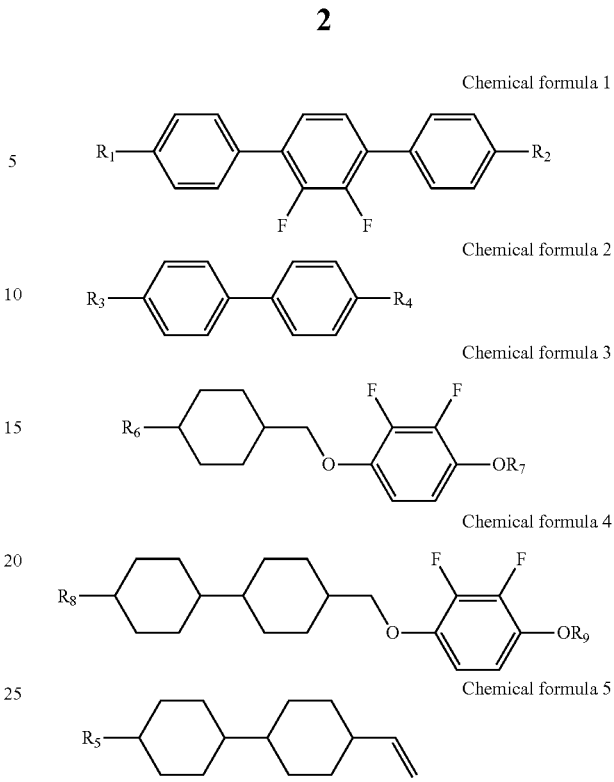

In Chemical formulae 1 to 5, each of $R_1$ to $R_9$ is an alkyl group, an alkenyl group, or an alkoxy group, which contains 2 to 5 carbon atoms.

The liquid crystal composition includes about 14 to about 16 weight percent first liquid crystal, about 20 to about 24 weight percent second liquid crystal, about 15 to about 20 weight percent third liquid crystal, about 3 to about 10 weight percent fourth liquid crystal, and about 21 to about 27 weight percent fifth liquid crystal.

The liquid crystal composition has an anisotropic refractive index equal to or larger than about 0.120, and a distance between the pixel electrode and the common electrode is equal to or smaller than about 2.6 micrometers.

The liquid crystal display further includes a backlight unit that supplies a light to the liquid crystal layer and a light converting unit disposed between the backlight unit and the first substrate or on the second substrate to convert the light to a light for a left eye and a light for a right eye.

The light converting unit includes a parallax barrier panel including a light transmission area transmitting the light and a light blocking area blocking the light, a lenticular panel including a plurality of lenses, or a patterned retarder polarizing the light to provide lights having different polarizing axes from each other. The light converting unit includes a first substrate, a second substrate facing the first substrate, and a light converting liquid crystal disposed between the first substrate and the second substrate. The light converting unit is turned off in a 2D mode, in which a 2D image is displayed, to transmit the light and turned on in a 3D mode in which a 3D image is displayed.

According to the above, the liquid crystal display improves the response speed thereof.

BRIEF DESCRIPTION OF THE DRAWINGS

The above and other advantages will become readily apparent by reference to the following detailed description when considered in conjunction with the accompanying drawings wherein.

DETAILED DESCRIPTION

Figure 1:
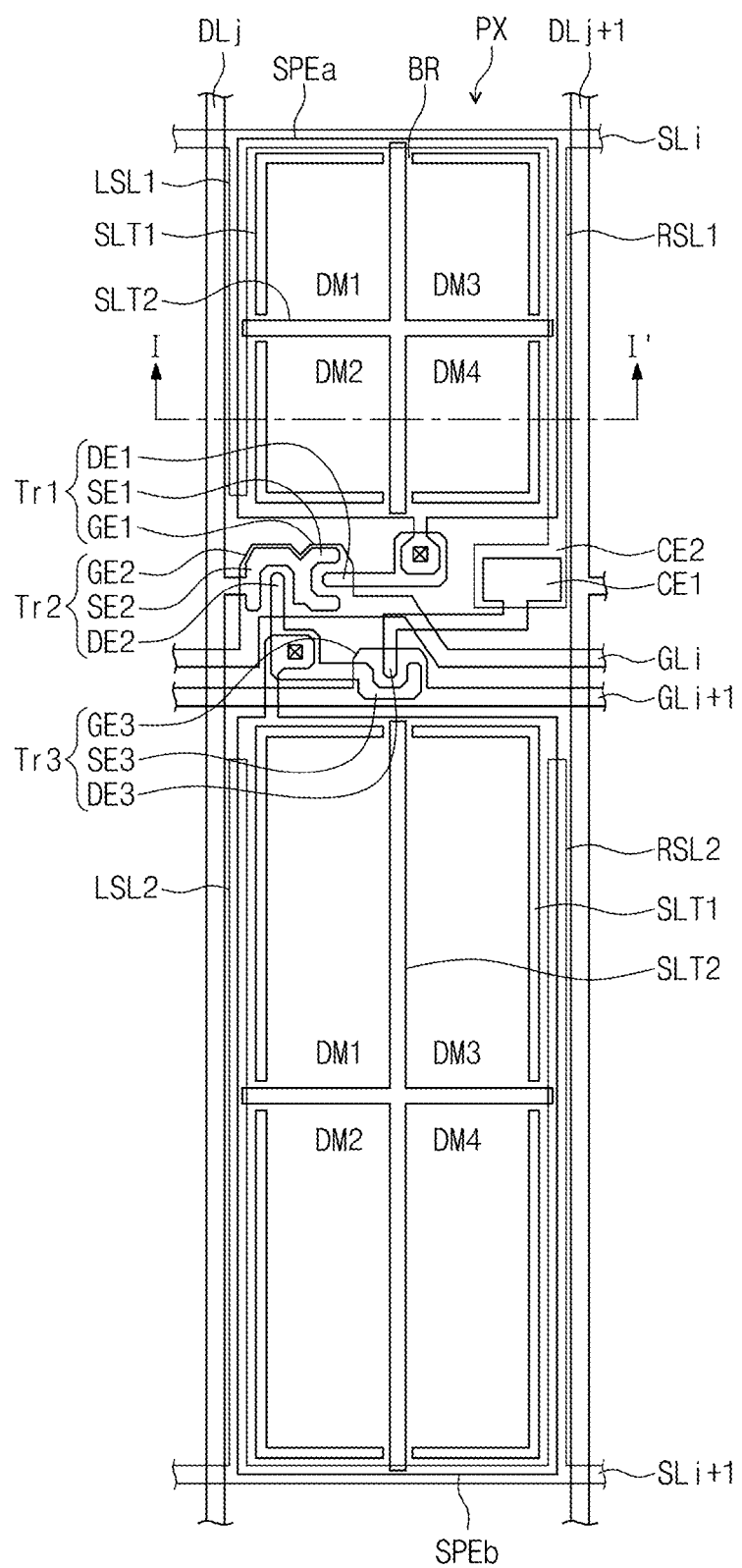
FIG. 1 is a plan view showing a pixel part of a liquid crystal display according to an exemplary embodiment.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below, depending on the orientation of the device. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 2:
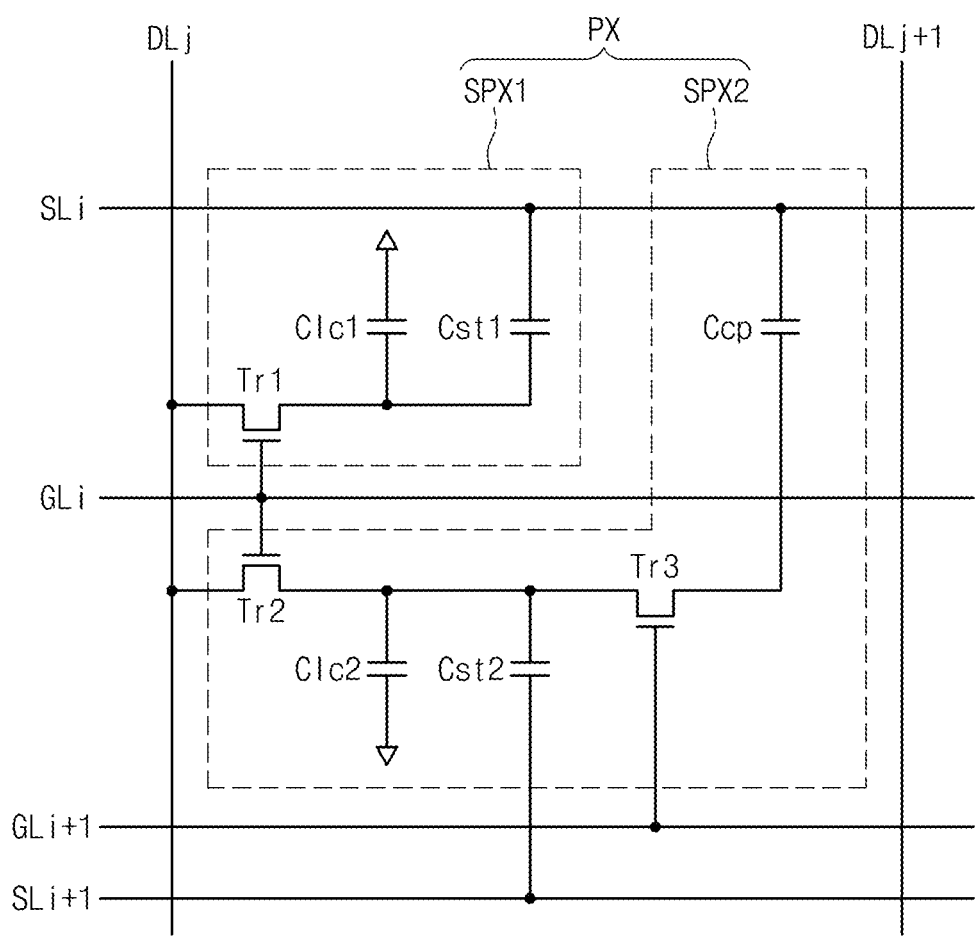
FIG. 2 is an equivalent circuit diagram of first and second sub-pixels shown in FIG. 1.
Figure 3:
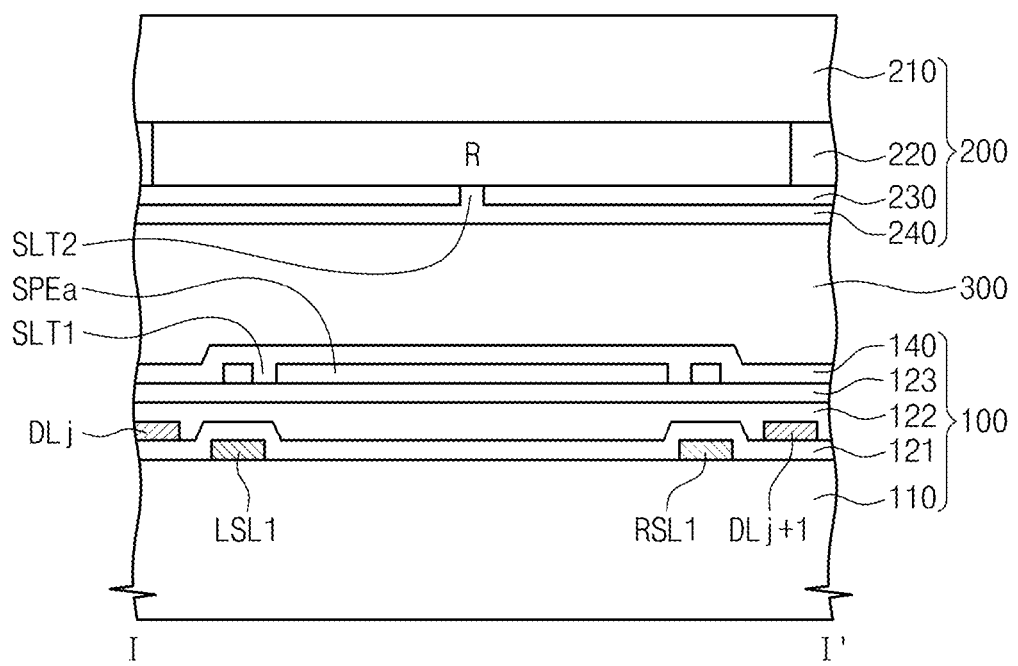
FIG. 3 is a cross-sectional view taken along a line I-I' of FIG. 1.

FIG. 1 is a plan view showing a pixel part of a liquid crystal display according to an exemplary embodiment, FIG. 2 is an equivalent circuit diagram of first and second sub-pixels shown in FIG. 1, and FIG. 3 is a cross-sectional view taken along a line I-I' of FIG. 1.

The liquid crystal display includes a plurality of pixels. FIG. 1 shows a portion of the plurality of pixels. Although not shown in FIG. 1, the pixels are arranged in a matrix form.

In addition, the liquid crystal display includes a plurality of gate lines and a plurality of data lines. In FIG. 1, the gate and data lines related to one pixel have been shown. In detail, as shown in FIG. 1, the liquid crystal display includes first and second data lines DLj and DLj+1 that are substantially parallel to each other, and first and second gate lines GLi and GLi+1 that are insulated from the first and second data lines DLj and DLj+1 while crossing the first and second data lines DLj and DLj+1.

The liquid crystal display further includes first and second storage lines SLi and SLi+1 that are substantially parallel to each other, first and second branch electrodes LSL1 and RSL1 branched from the first storage line SLi, and third and fourth branch electrodes LSL2 and RSL2 branched from the second storage line SLi+1.

The pixel PX includes a first sub-pixel SPX1 (FIG. 2) and a second sub-pixel SPX2. The first sub-pixel SPX1 includes a first thin film transistor Tr1 and a first sub-pixel electrode SPEa. The second sub-pixel SPX2 includes a second thin film transistor Tr2, a second sub-pixel electrode SPEb, a third thin film transistor Tr3, and a coupling capacitor Ccp. The first and second sub-pixels SPX1 and SPX2 are disposed between the first and second data lines DLj and DLj+1 adjacent to each other.

The first thin film transistor Tr1 is connected to the first data line DLj and the first gate line GLi. The second thin film transistor Tr2 is connected to the first data line DLj and the first gate line GLi. In detail, the first thin film transistor Tr1 includes a first source electrode SE1 connected to the first data line DLj, a first gate electrode GE1 connected to the first gate line GLi, and a first drain electrode DE1 connected to the first sub-pixel electrode SPEa. The first sub-pixel electrode SPEa faces a common electrode 230 (FIG. 3) with a liquid crystal layer 300 interposed therebetween to form a first liquid crystal capacitor Clc1. In addition, the first sub-pixel electrode SPEa is overlapped with the first storage line SLi and the first and second branch electrodes LSL1 and RSL1 to form a first storage capacitor Cst1. Accordingly, the first storage capacitor Cst1 may be connected to the first liquid crystal capacitor Clc1 in parallel.

The second thin film transistor Tr2 includes a second source electrode SE2 connected to the first data line DLj, a second gate electrode GE2 connected to the first gate line GLi, and a second drain electrode DE2 connected to the second sub-pixel electrode SPEb. The second sub-pixel electrode SPEb faces the common electrode 230 with the liquid crystal layer interposed therebetween to form a second liquid crystal capacitor Clc2. In addition, the second sub-pixel electrode SPEb is overlapped with the second storage line SLi+1 and the third and fourth branch electrodes LSL2 and RSL2 to form a second storage capacitor Cst2. Accordingly, the second storage capacitor Cst2 may be connected to the second liquid crystal capacitor Clc2 in parallel.

When a first gate signal is applied to the first gate line GLi, the first and second thin film transistors Tr1 and Tr2 are substantially simultaneously turned on. A data voltage applied to the first data line DLj is applied to the first and second sub-pixel electrodes SPEa and SPEb through turned-on first and second thin film transistors Tr1 and Tr2. Thus, the first and second liquid crystal capacitors Clc1 and Clc2 are charged with the same pixel voltage during a high period of the first gate signal.

The third thin film transistor Tr3 includes a third source electrode SE3 connected to the second drain electrode DE2 of the second thin film transistor Tr2, a third gate electrode GE3 connected to the second gate line GLi+1, and a third drain electrode DE3 connected to the coupling capacitor Ccp. As an example, the coupling capacitor Ccp includes a first electrode CE1 extended from the third drain electrode DE3 and a second electrode CE2 extended from the second branch electrode RSL1 to face the first electrode CE1 with an insulating layer 121 interposed between the first and second electrodes CE1 and CE2. However, the structure of the coupling capacitor Ccp should not be limited thereto or thereby.

The second gate line GLi+1 receives a second gate signal rising after the first gate signal falls. When the third thin film transistor Tr3 is turned on in response to the second gate signal, a voltage division occurs between the second liquid crystal capacitor Clc2 and the coupling capacitor Ccp, so the pixel voltage charged in the second liquid crystal capacitor Clc2 is reduced. The reduction of the pixel voltage depends on the charge rate of the coupling capacitor Ccp.

Consequently, after the second gate signal is generated, the first liquid crystal capacitor Clc1 is charged with the pixel voltage and the second liquid crystal capacitor Clc2 is charged with a pixel voltage that is lower than that of the pixel voltage charged in liquid crystal capacitor Clc1.

The first sub-pixel electrode SPEa may be formed with one domain having one liquid crystal alignment direction, or may be divided into a plurality of domains having at least two liquid crystal alignment directions that are different from each other, but it should not be limited thereto or thereby. In detail, the first sub-pixel electrode SPEa may be divided into first to fourth domains DM1 to DM4 having liquid crystal alignment directions that are all different from each other. Also, the second sub-pixel electrode SPEb may be formed with one domain having one liquid crystal alignment direction or may be divided into a plurality of domains having at least two liquid crystal alignment directions that are different from each other. For instance, the second sub-pixel electrode SPEb may be divided into first to fourth domains DM1 to DM4. The alignment of liquid crystal molecules in the first to fourth domains DM1 to DM4 may be achieved by using light.

Referring to FIG. 3, the liquid crystal display includes a first substrate 100, a second substrate 200 facing the first substrate 100 while being coupled to the first substrate 100, and the liquid crystal layer 300 interposed between the first substrate 100 and the second substrate 200.

The first substrate 100 includes a first base substrate 110 made of a transparent insulating substrate. A gate line part including the first and second gate lines GLi and GLi+1, the first and second storage lines SLi and SLi+1, and the first to fourth branch electrodes LSL1, RSL1, LSL2, and RSL2 are disposed on the first base substrate 110.

The first substrate 100 includes a first insulating layer 121 to cover the gate line part, and a data line part including the first and second data lines DLj and DLj+1 is disposed on the first insulating layer. The data line part is covered by a second insulating layer 122 and a third insulating layer 123 is disposed on the second insulating layer 122.

The first sub-pixel electrode SPEa and the second sub-pixel electrode SPEb are disposed on the third insulating layer 123.

The first substrate 100 further includes a first alignment layer 140 to cover the first sub-pixel electrode SPEa and the second sub-pixel electrode SPEb. The first alignment layer 140 may include a polymer material in which a decomposition, dimerization, or isomerization reaction occurs when irradiated with light, e.g., an ultraviolet ray or a laser. In addition, the first alignment layer 140 may include, for example, polymerized reactive mesogen.

The second substrate 200 includes a second base substrate 210 facing the first base substrate 110. A color filter layer 220 is disposed on the second base substrate 210, and the color filter layer 220 includes red, green, and blue color pixels R, G, and B.

The common electrode 230 is disposed on the color filter layer 220. The common electrode 230 faces the first sub-pixel electrode SPEa to form the first liquid crystal capacitor Clc1. Although not shown in figures, the common electrode 230 also faces the second sub-pixel electrode SPEb to form the second liquid crystal capacitor Clc2.

A common voltage is applied to the common electrode 230 so that it forms an equipotential surface (that is, there is an equal potential across the surface of the common electrode 230) substantially parallel to a surface of the first substrate 100 in cooperation with the first and second sub-pixel electrodes SPEa and SPEb according to the application of the data voltage to the first and second sub-pixel electrodes SPEa and SPEb. The equipotential surface of the common electrode extends across substantially all of the surface of the common electrode 230 that is between the slits SLT2, and is created because of the plate-shaped surface (i.e., without micro-slits) of the common electrode 230.

The second substrate 200 further includes a second alignment layer 240 to cover the common electrode 230. The second alignment layer 240 may include a polymer material in which a decomposition, dimerization, or isomerization reaction occurs by irradiation of the polymer material with light, e.g., an ultraviolet ray or a laser. In addition, the second alignment layer 240 may include, for example, polymerized reactive mesogen.

Figure 4A:
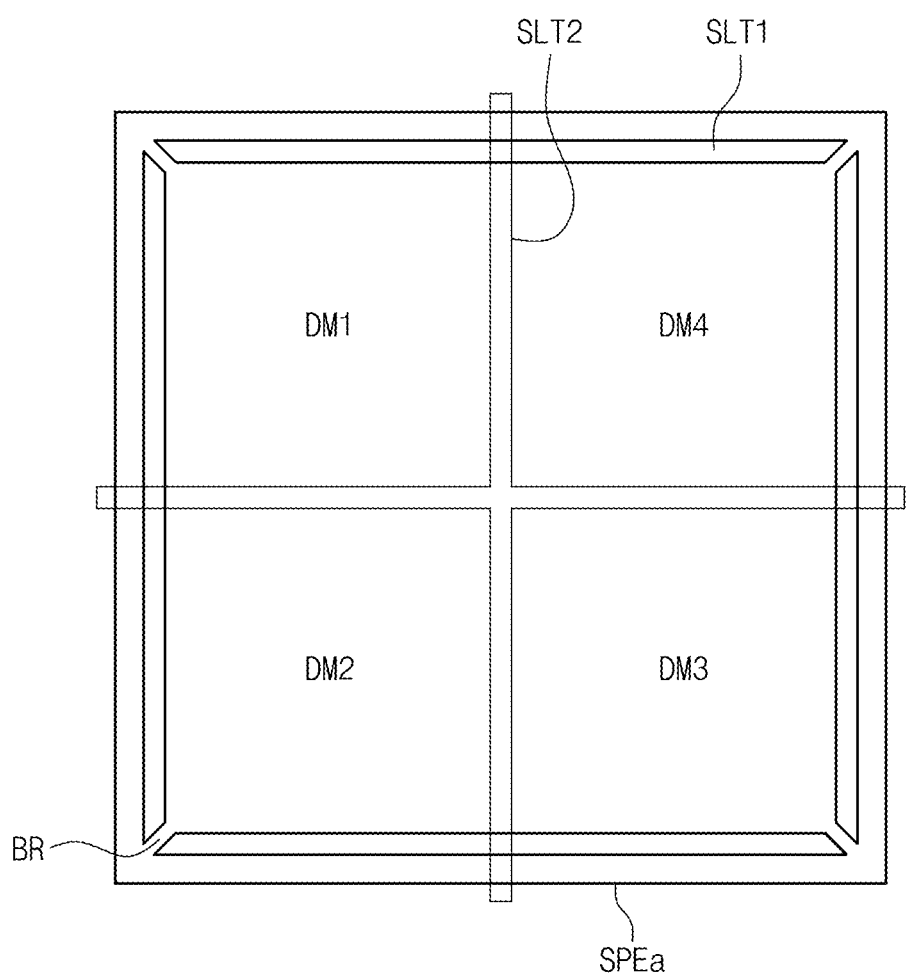
FIGS. 4A and 4B are plan views showing a first sub-pixel electrode and a common electrode in a sub-pixel including a plurality of domains.

Each of the first sub-pixel electrode SPEa and the second sub-pixel electrode SPEb includes at least one first slit SLT1 formed in each of the domains DM. For instance, the first sub-pixel electrode SPEa and the second sub-pixel electrode SPEb may have a rectangular shape, and the first slit SLT1 is made in a position that is substantially parallel to a side of each domain, e.g., at least one side of the rectangular shape, or is made in a position that is along a portion of a side of the first sub-pixel electrode SPEa and/or the second sub-pixel electrode SPEb. The first slit SLT1 may include a plurality of sub-slits. The sub-slits are extended along sides of the rectangular shape to be adjacent to the sides of the rectangular shape. When assuming that a portion between the sub-slits adjacent to each other is referred to as a connection portion BR (as shown in FIG. 4A), the connection portion BR may be positioned at a position corresponding to a center of each side of the rectangular shape (as shown in FIG. 1) The common electrode 230 includes a second slit SLT2 formed in a position in the common electrode 230 corresponding to the position of each of the first sub-pixel electrode SPEa and the second sub-pixel electrode SPEb. The second slit SLT2 is made in a position that is substantially parallel to at least one side and crosses a center portion of each of the first and second sub-pixel electrodes SPEa and SPEb. For example, the second slit SLT2 may be made in a position that is substantially parallel to a long side and a short side of each of the first and second sub-pixel electrodes SPEa and SPEb, so that second slit SLT2 has a cross shape.

The first slit SLT1 and the second slit SLT2 may be formed in various shapes along the side of the domains.

Figure 4B:
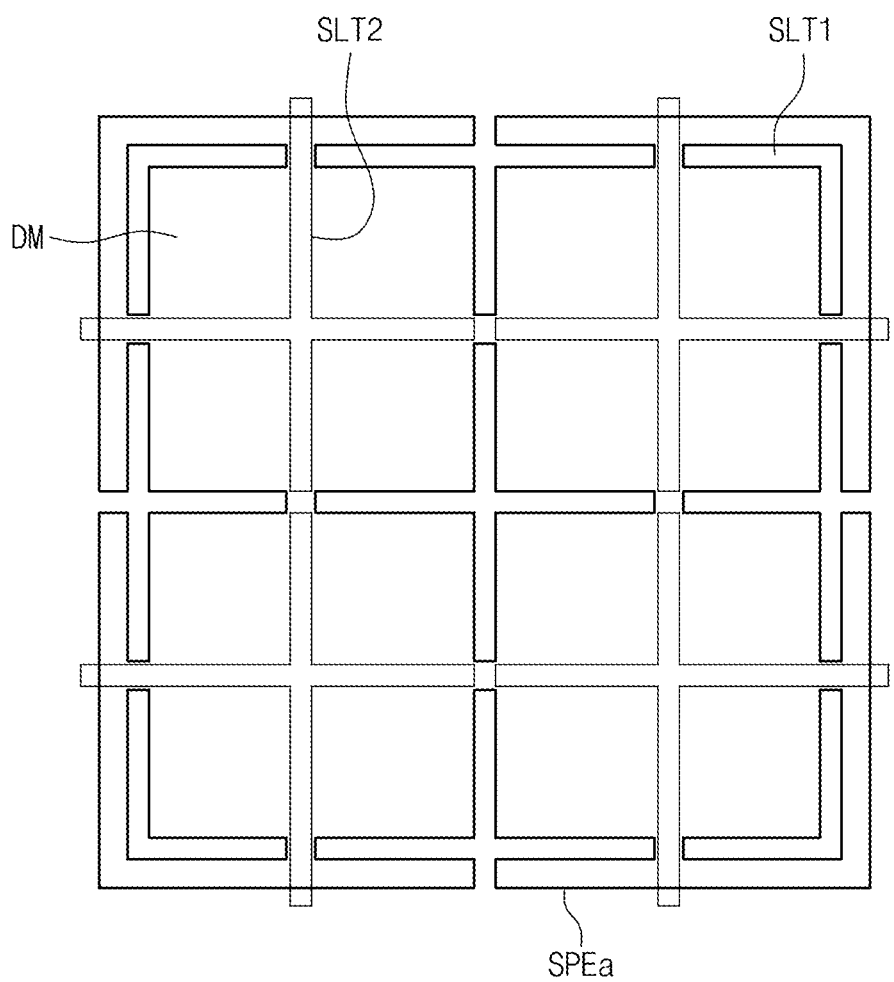

FIGS. 4A and 4B are plan views showing the first sub-pixel electrode SPEa including the first slit SLT1 and the position of the second slit SLT2 of the common electrode 230 in relation to the sub-pixel including the domains DM.

Referring to FIGS. 4A and 4B, the sub-pixel includes the domains DM, and the connection portion BR of the first slit SLT1 is provided at a position corresponding to a corner of the rectangular shape of the first sub-pixel electrode SPEa or between the domains DM. The second slit SLT2 is provided between the domains. The second slit SLT2 is extended parallel to the two sides of the first sub-pixel electrode SPEa, which are perpendicular to each other, to have the cross shape.

According to the liquid crystal display having the sub-pixels of the above-mentioned structure, a planar equipotential surface is formed in each domain by the sub-pixel electrodes and the common electrode having the plate-shaped, flat surface, which is substantially parallel to the upper surface of the first substrate.

The liquid crystal layer 300 (FIG. 3) is disposed between the common electrode 230 and the sub-pixel electrodes SPEa. In the present exemplary embodiment, the distance between the common electrode 230 and the sub-pixel electrodes SPEa, e.g., the cell gap, is equal to or smaller than about 2.6 micrometers. The liquid crystal layer 300 may include a liquid crystal composition having an anisotropic refractive index equal to or larger than about 0.120 and/or an anisotropic dielectric constant equal to or smaller than −2.9 and equal to or larger than −1.7.

The liquid crystal composition includes at least one first liquid crystal selected from the group consisting of compounds represented by the following Chemical formula 1, at least one second liquid crystal selected from the group consisting of compounds represented by the following Chemical formula 2, at least one third liquid crystal selected from the group consisting of compounds represented by the following Chemical formula 3, at least one fourth liquid crystal selected from the group consisting of compounds represented by the following Chemical formula 4, and at least one fifth liquid crystal selected from the group consisting of compounds represented by the following Chemical formula 5. The liquid crystal composition on the basis on the liquid crystal composition may be comprised of about 14 to about 16 weight percent first liquid crystal, about 20 to about 24 weight percent second liquid crystal, about 15 to about 20 weight percent third liquid crystal, about 3 to about 10 weight percent fourth liquid crystal, and about 21 to about 27 weight percent fifth liquid crystal.

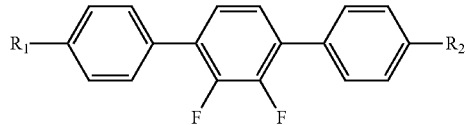

Chemical formula 1

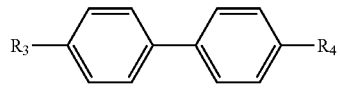

Chemical formula 2

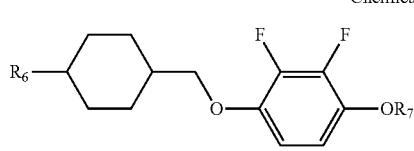

Chemical formula 3

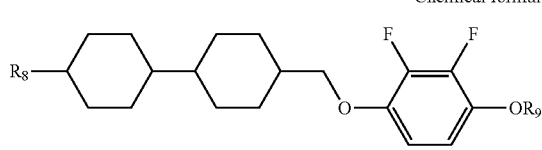

Chemical formula 4

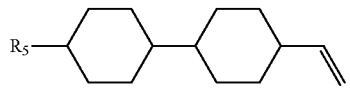

Chemical formula 5

In chemical formulae 1 to 5, each of $R_1$ to $R_9$ is an alkyl group, an alkenyl group, or an alkoxy group, which contains 2 to 5 carbon atoms.

The liquid crystal display having the above-described structure has a smaller cell gap and a faster response speed than those of a conventional liquid crystal display.

In the liquid crystal display, a response time Ton (hereinafter, referred to as on-response time) measured when the voltage is applied to each pixel (e.g., ON state) and a response time Toff (hereinafter, off-response time) measured when no voltage is applied to each pixel (e.g., OFF state) may be obtained by the following Equations 1 and 2.

$$T_{on} \propto \frac{\gamma_1}{\Delta\Pi^2} \frac{1}{K_{eff}} \left( \frac{1}{\left(\frac{V_{on}}{V_{off}}\right)^2 - 1} \right) \quad \text{Equation 1}$$

$$T_{off} \propto \frac{\gamma_1}{\Delta\Pi^2} \frac{1}{K_{eff}} \quad \text{Equation 2}$$

In Equations 1 and 2, γ1 denotes a rotational viscosity of the liquid crystal, Δn denotes the anisotropic refractive index of the liquid crystal, Keff denotes an elastic coefficient of the liquid crystal, Von denotes an on-voltage applied to each sub-pixel, and Voff denotes an off-voltage applied to each sub-pixel.

As shown in Equation 1, the on-response time Ton is affected by the rotational viscosity of the liquid crystal, the anisotropic refractive index of the liquid crystal, the elastic coefficient of the liquid crystal, and the voltage applied to each pixel. As shown in Equation 2, because the off-response time Toff is a function of the rotational viscosity of the liquid crystal, the anisotropic refractive index of the liquid crystal, and the elastic coefficient of the liquid crystal, the off-response time Toff is affected by physical properties of the liquid crystal. Therefore, by controlling the physical properties of the liquid crystal, such as the anisotropic dielectric constant or the anisotropic refractive index, the off-response time Toff can be reduced, thereby improving the response speed of the liquid crystal.

Accordingly, in the present exemplary embodiment, the liquid crystal composition having the anisotropic refractive index equal to or larger than 0.120 may be used so as to reduce the on-response time Ton and the off-response time Toff. In addition, the liquid crystal having the anisotropic dielectric constant equal to or smaller than −2.9 and equal to or larger than −1.7 may be used so as to reduce the on-response time Ton and the off-response time Toff. When the anisotropic dielectric constant is reduced, the rotational viscosity is decreased. Thus, the on-response time Ton and the off-response time Toff are reduced, so the response speed of the liquid crystal becomes faster.

However, because the anisotropic dielectric constant and the transmittance of the liquid crystal are in a trade-off relationship, the transmittance is lowered when the anisotropic dielectric constant is reduced in the case of a conventional patterned vertical alignment mode liquid crystal display. The conventional patterned vertical alignment mode liquid crystal display includes a plurality of domains to improve a viewing angle, with each domain having a distorted vertical electric field.

Figure 5A:
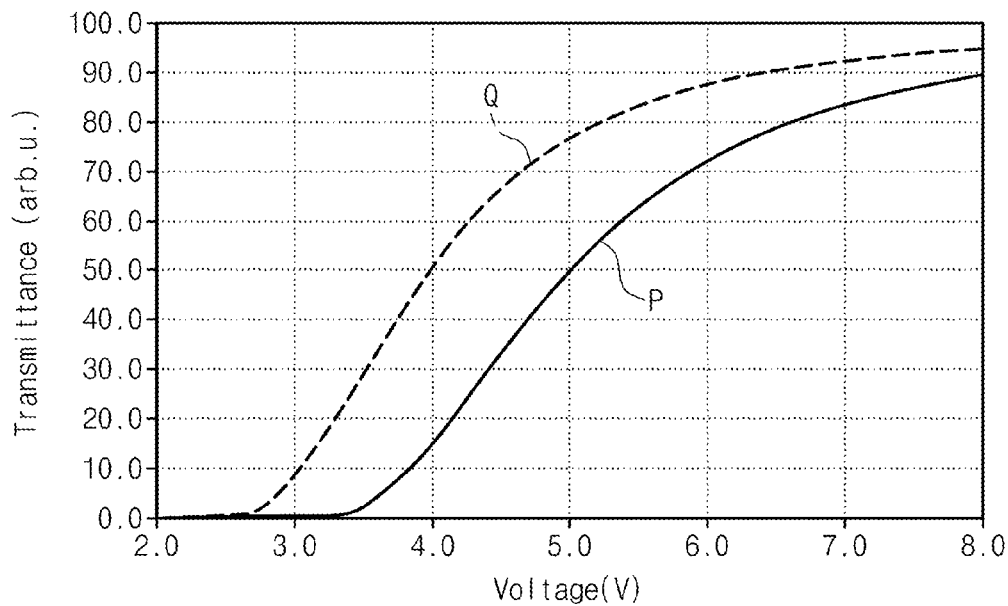
FIG. 5A is a graph showing a voltage versus a transmittance (V-T) according to an applied voltage when a dielectric constant is changed in conventional vertical alignment mode liquid crystal display.

FIG. 5A is a graph showing a voltage versus a transmittance (V-T) curve according to an applied voltage when a dielectric constant is changed in a conventional vertical alignment mode liquid crystal display. In FIG. 5A, "P" represents the V-T graph when the anisotropic dielectric constant is about −1.7 and "Q" represents the V-T graph when the anisotropic dielectric constant is about −2.9. In this case, all the other conditions, including the cell gap, are the same. As shown in FIG. 5A, in the conventional vertical alignment mode liquid crystal display, the transmittance measured when the anisotropic dielectric constant is about −1.7 is lower than the transmittance measured when the anisotropic dielectric constant is about −2.9.

Figure 5B:
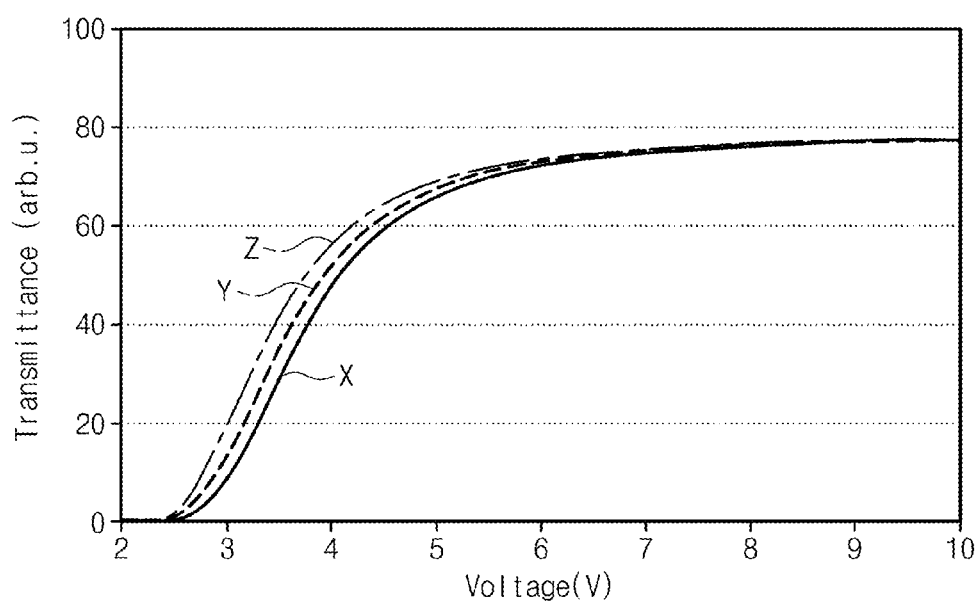
FIG. 5B is a graph showing a voltage versus a transmittance (V-T) according to an applied voltage when a dielectric constant is changed in the liquid crystal display according to the present exemplary embodiment.

On the other hand, because the liquid crystal display according to the present exemplary embodiment has the planar equipotential surface, the transmittance is not changed even though the anisotropic dielectric constant is reduced. FIG. 5B is a graph showing a voltage versus a transmittance (V-T) curve according to an applied voltage when a dielectric constant is changed in the liquid crystal display according to the present embodiment. In FIG. 5B, "X" represents the V-T graph when the anisotropic dielectric constant is about −2.5, "Y" represents the V-T graph when the anisotropic dielectric constant is about −2.7, and "Z" represents the V-T graph when the anisotropic dielectric constant is about −3.0. In this case, all the other conditions, including the cell gap, are the same. As shown in FIG. 5B, in the liquid crystal display according to the present exemplary embodiment, the transmittance is not varied substantially even though the anisotropic dielectric constant is changed. Therefore, the liquid crystal display according to the present exemplary embodiment may maintain the transmittance after the on-response time Ton and the off-response time Toff are reduced. As a result, the response speed becomes faster.

Figure 6A:
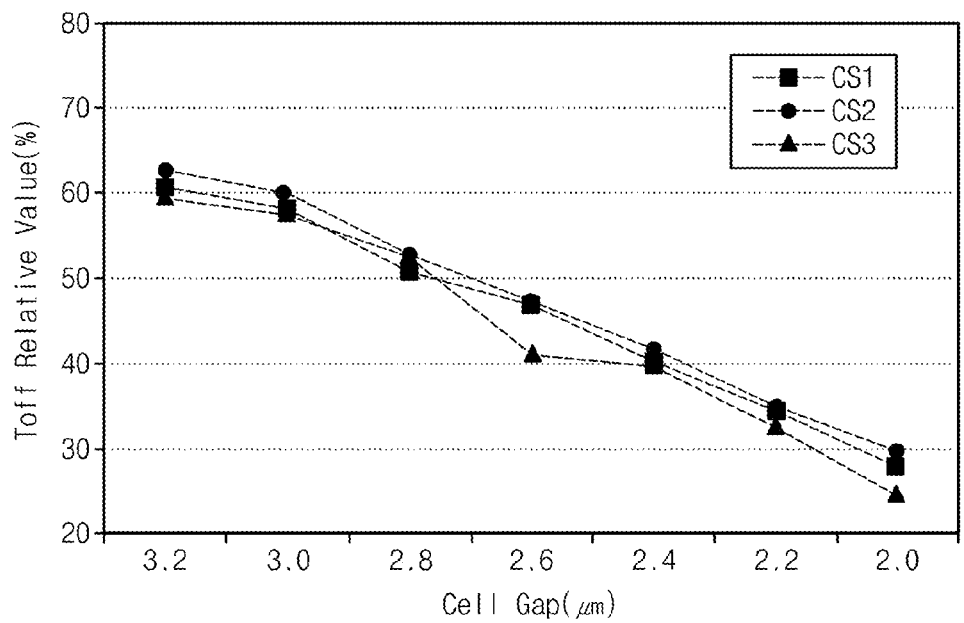
FIG. 6A is a graph showing a value of Toff when a liquid crystal composition is used with a liquid crystal display.

The off-response time Toff is also affected by the cell gap in addition to the above-mentioned sources. FIG. 6A is a graph showing a value of the off-response time Toff when the liquid crystal composition is applied to the liquid crystal display. In detail, the value of the off-response time Toff has been represented as a relative value according to the cell gap in the liquid crystal display according to the present exemplary embodiment and the conventional liquid crystal display. In FIG. 6A, CS1 indicates the relative value of the liquid crystal display according to the present exemplary embodiment, CS2 indicates the relative value of the patterned vertical alignment (PVA) mode liquid crystal display in which electrodes are patterned, and CS3 indicates the relative value of a super vertical alignment (SVA) mode liquid crystal display in which one of the electrodes has a micro-slit. As shown in FIG. 6A, as the cell gap is reduced, the off-response time Toff is decreased.

Figure 6B:
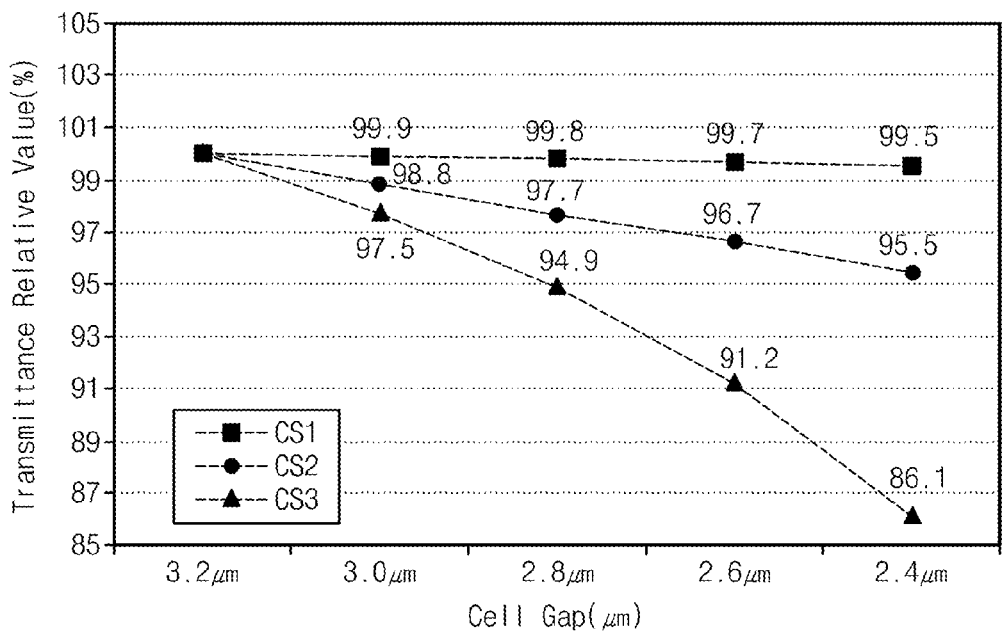
FIG. 6B is a graph showing a transmittance according to a cell gap of conventional liquid crystal displays and a liquid crystal display according to an exemplary embodiment.

However, as shown in FIG. 6B, in the conventional liquid crystal display, the transmittance is also lowered when the cell gap is reduced. On the other hand, although the cell gap is reduced, the transmittance is not varied substantially in the liquid crystal display according to the present exemplary embodiment.

FIG. 6B is a graph showing a transmittance according to a cell gap of conventional liquid crystal displays and a liquid crystal display according to an exemplary embodiment. In FIG. 6B, CS1 indicates the liquid crystal display according to the present exemplary embodiment, CS2 indicates the conventional PVA mode liquid crystal display, and CS3 indicates the SVA mode liquid crystal display.

Referring to FIG. 6B, although the cell gap is reduced, the transmittance of the liquid crystal display according to the present exemplary embodiment is uniformly maintained, and particularly, the transmittance is maintained over 99% even though the cell gap is equal to or smaller than 2.6 micrometers. However, in the conventional PVA and SVA liquid crystal displays, the transmittance is rapidly lowered when the cell gap is reduced to under 3.0 micrometers. The conventional PVA and SVA liquid crystal displays do not have the planar equipotential surface parallel to the surface of the substrate, and thus are affected by the electric field when the cell gap is reduced. Consequently, the liquid crystal display of the embodiments may have the relatively small cell gap (e.g., equal to or smaller than 2.6 micrometers) when compared with the conventional PVA and SVA liquid crystal displays.

As described above, the liquid crystal display according to the present exemplary embodiment may have a relatively small cell gap and relatively fast response speed while maintaining transmittance similar to that of the conventional liquid crystal display. In the present exemplary embodiment, the liquid crystal layer including the liquid crystal composition applied to the above-mentioned embodiments may be employed to the other display apparatuses, and when such other display apparatuses have a planar equipotential surface parallel to the surface of the substrate, the performance of the display apparatus having the liquid crystal layer including the liquid crystal composition is improved. However, the liquid crystal layer should not be limited to devices thereto or thereby.

Figure 7A:
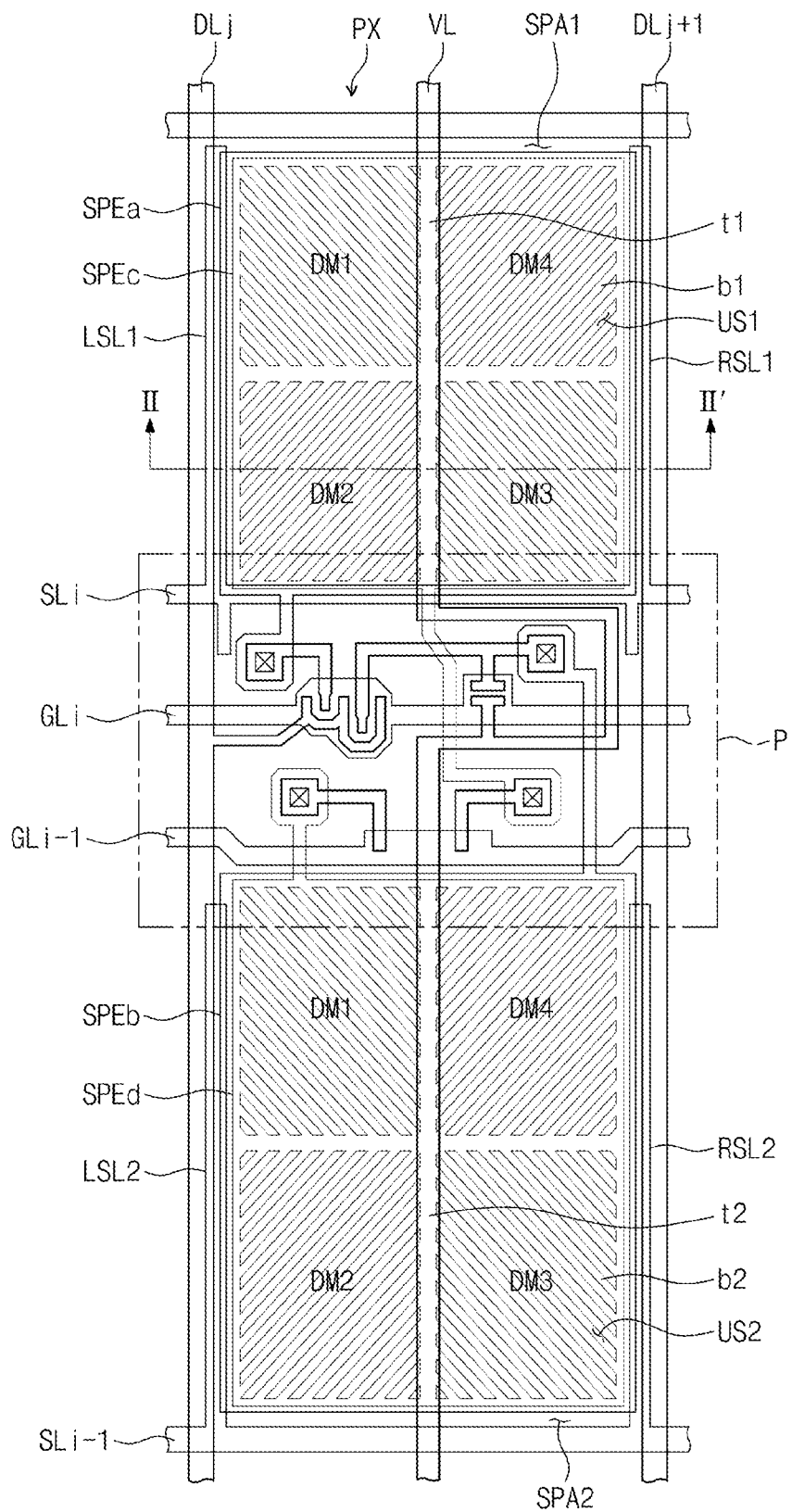
FIG. 7A is a plan view showing a pixel part of a liquid crystal display according to an exemplary embodiment.
Figure 7B:
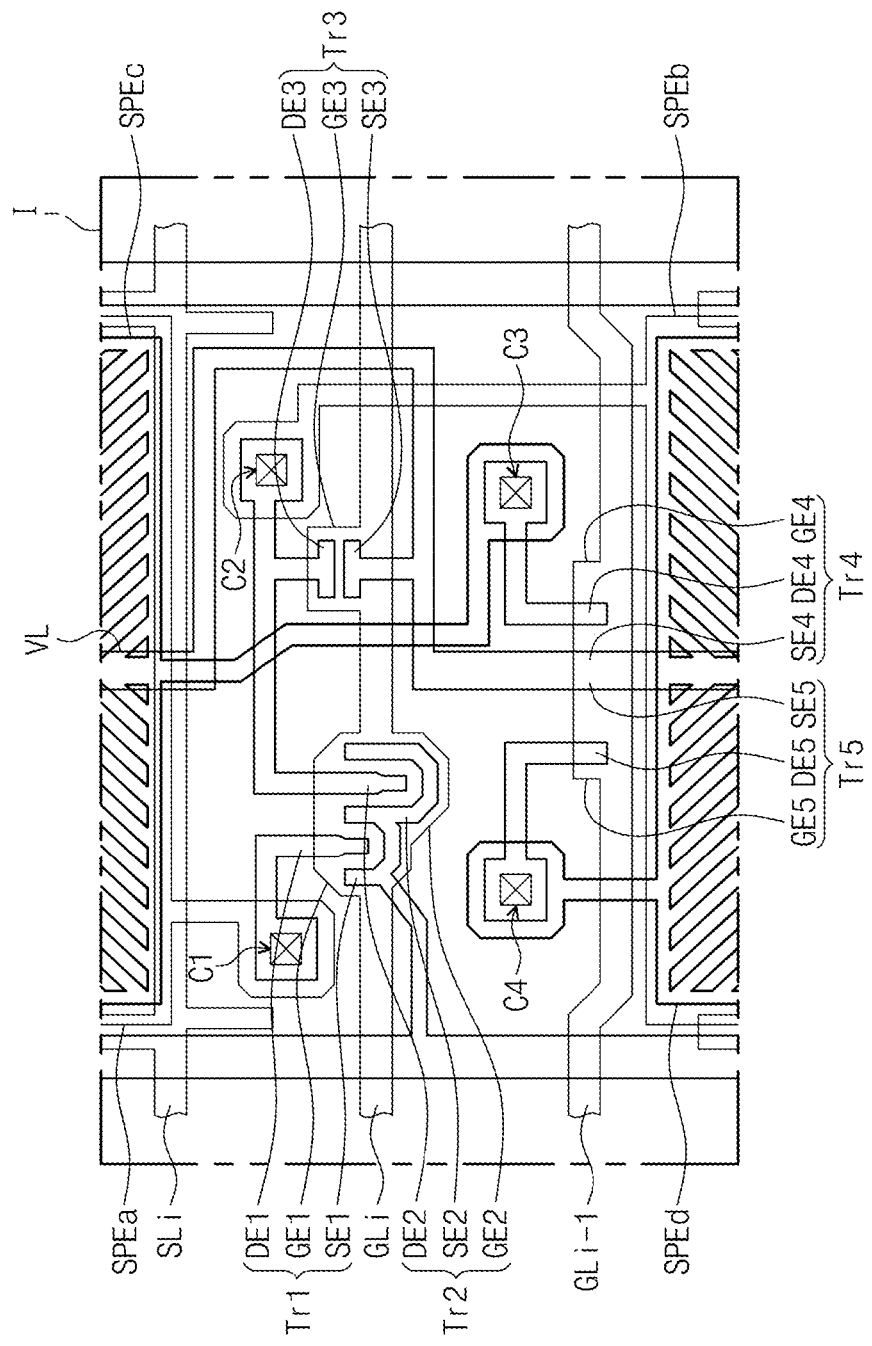
FIG. 7B is a partially enlarged view showing a portion P shown in FIG. 7A.
Figure 8:
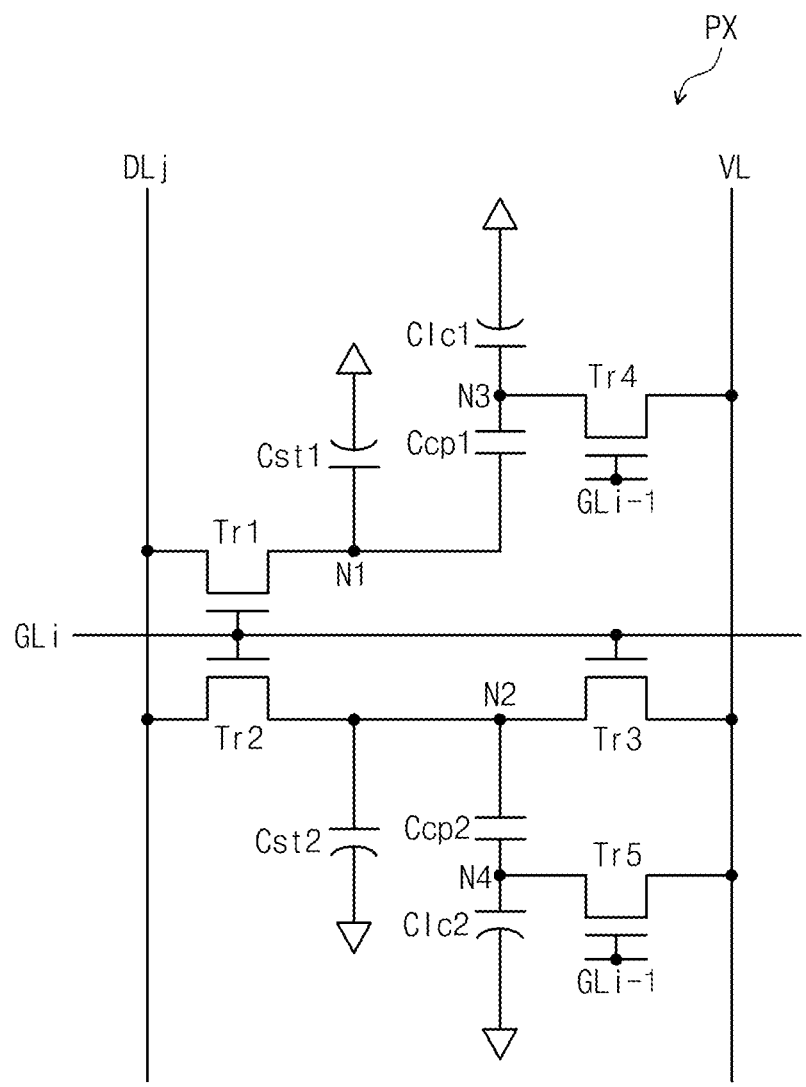
FIG. 8 is an equivalent circuit diagram showing a pixel shown in FIG. 7B.
Figure 9:
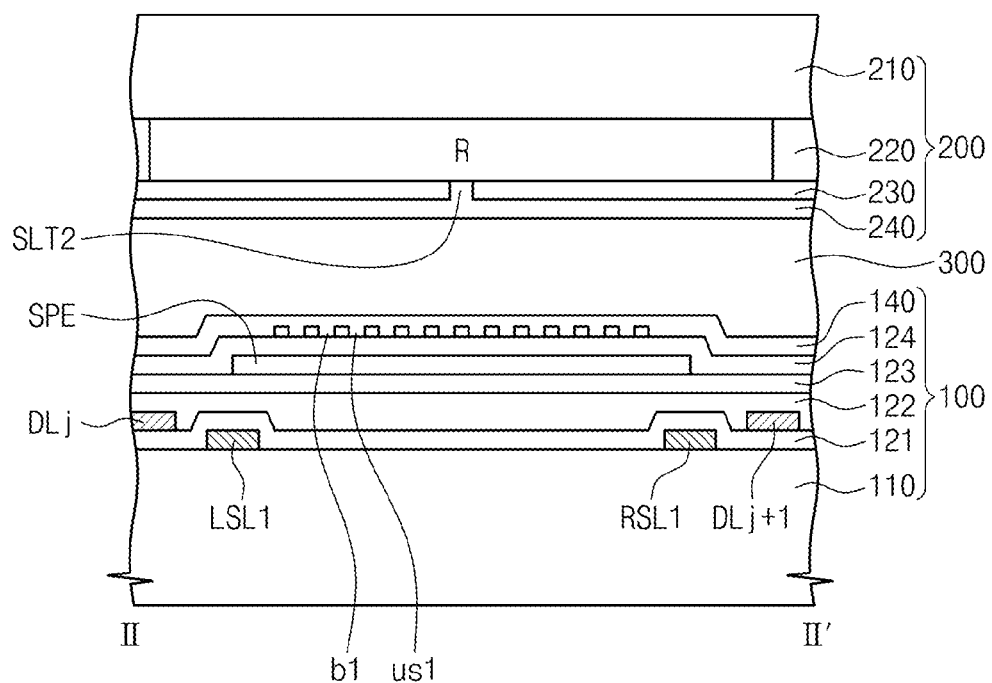
FIG. 9 is a cross-sectional view taken along a line II-II' of FIG. 7A.

FIG. 7A is a plan view showing a pixel part of a liquid crystal display according to an exemplary embodiment and FIG. 7B is a partially enlarged view showing a portion P shown in FIG. 7A. FIG. 8 is an equivalent circuit diagram showing a pixel shown in FIG. 7B and FIG. 9 is a cross-sectional view taken along a line II-II' of FIG. 7A.

Referring to FIGS. 7A, 7B, 8, and 9, the liquid crystal display includes a plurality of pixels PX arranged in a matrix form. The liquid crystal display includes a plurality of gate lines and a plurality of data lines. In FIGS. 7A, 7B, 8, and 9, the gate and data lines related to one pixel of the plurality of pixels have been shown.

The liquid crystal display includes first and second gate lines GLi and GLi−1, a data line DLj, first and second storage lines SLi and SLi−1, and a voltage line VL.

The pixel PX includes a first thin film transistor Tr1, a second thin film transistor Tr2, a third thin film transistor Tr3, first and second liquid crystal capacitors Clc1 and Clc2, first and second storage capacitors Cst1 and Cst2, and first and second coupling capacitors Ccp1 and Ccp2.

The first thin film transistor Tr1 includes a gate electrode GE1 connected to the first gate line GLi, a source electrode SE1 connected to the data line DLj, and a drain electrode DE1 connected to the first coupling capacitor Ccp1. The second thin film transistor Tr2 includes a gate electrode GE2 connected to the first gate line GLi, a source electrode SE2 connected to the data line DLj, and a drain electrode DE2 connected to the second coupling capacitor Ccp2.

The pixel PX includes a first sub-pixel electrode SPEa as a first electrode of the first coupling capacitor Ccp1 and a second sub-pixel electrode SPEb as a first electrode of the second coupling capacitor Ccp2. The first sub-pixel electrode SPEa is electrically connected to the drain electrode DE1 of the first thin film transistor Tr1 through a first contact hole C1, and the second sub-pixel electrode SPEb is electrically connected to the drain electrode DE2 of the second thin film transistor Tr2 through a second contact hole C2.

The pixel PX further includes a third sub-pixel electrode SPEc as a second electrode of the first coupling capacitor Ccp1 and a fourth sub-pixel electrode SPEd as a second electrode of the second coupling capacitor Ccp2.

Although not shown in figures, the third and fourth sub-pixel electrodes SPEc and SPEd face a reference electrode CE of the second substrate 210 with a liquid crystal layer interposed between the reference electrode CE and the third and fourth sub-pixel electrodes SPEc and SPEd to form the first and second liquid crystal capacitors Clc1 and Clc2, respectively.

In addition, the first and second sub-pixel electrodes SPEa and SPEb are respectively overlapped with the first and second storage lines SLi and SLi−1 with at least one insulating layer interposed therebetween so as to form the first and second storage capacitors Cst1 and Cst2.

The third thin film transistor Tr3 includes a gate electrode GE3 connected to the first gate line GLi, a source electrode SE3 connected to the voltage line VL, and a drain electrode DE3 connected to the drain electrode DE2 of the second thin film transistor Tr2.

In a 1G-1D (one gate line-one data line) structure in which the first and second sub-pixels are commonly connected to the first gate line GLi and the data line DLj, the first and second sub-pixels may be charged with different voltages from each other by a voltage division.

The pixel PX further includes a fourth thin film transistor Tr4 and a fifth thin film transistor Tr5.

The fourth thin film transistor Tr4 includes a gate electrode GE4 connected to the second gate line GLi−1, a source electrode SE4 connected to the voltage line VL, and a drain electrode DE4 electrically connected to the third sub-pixel electrode SPEc. The fifth thin film transistor Tr5 includes a gate electrode GE5 connected to the second gate line GLi−1, a source electrode SE5 connected to the voltage line VL, and a drain electrode DE5 electrically connected to the fourth sub-pixel electrode SPEd. The drain electrode DE4 of the fourth thin film transistor Tr4 is connected to the third sub-pixel electrode SPEc through a third contact hole C3 and the drain electrode DE5 of the fifth thin film transistor Tr5 is connected to the fourth sub-pixel electrode SPEd through a fourth contact hole C4.

Referring to FIG. 7A, the third sub-pixel electrode SPEc includes a first trunk portion t1 and a plurality of first branch portions b1 extended from the first trunk portion t1 in a radial direction in order to divide a first sub-pixel area SPA1 into a plurality of domains. The first trunk portion t1 has a cross shape, and thus the first sub-pixel area SPA1 is divided into four domains, e.g., first, second, third, and fourth domains DM1, DM2, DM3, and DM4, by the first trunk portion t1. The first branch portions b1 are extended to be substantially parallel to each other and are spaced apart from each other at regular intervals in the domains DM1, DM2, DM3, and DM4. As an example, the first branch portions b1 are inclined at an angle of about 45 degrees with respect to the first trunk portion t1 while being extended in each domain. In the first branch portions b1, two adjacent first branch portions b1 are spaced apart from each other by a unit of micrometer in the range of about 1 to 100 so as to form a plurality of first micro-slits US1.

The fourth sub-pixel electrode SPEd includes a second trunk portion t2 and a plurality of second branch portions b2 extended from the second trunk portion t2 in a radial direction in order to divide a second sub-pixel area SPA2 into a plurality of domains. The second trunk portion t2 has a cross shape, and thus the second sub-pixel area SPA2 is divided into four domains, e.g., first, second, third, and fourth domains DM1, DM2, DM3, and DM4, by the second trunk portion t2. The second branch portions b2 are extended to be substantially parallel to each other and are spaced apart from each other at regular intervals in the domains DM1, DM2, DM3, and DM4. In the second branch portions b2, two adjacent second branch portions b2 are spaced apart from each other by a unit of micrometer so as to form a plurality of second micro-slits US2.

Referring to FIG. 9, the liquid crystal display includes a first substrate 100, a second substrate 200 facing the first substrate 100 while being coupled to the first substrate 100, and a liquid crystal layer 300 interposed between the first substrate 100 and the second substrate 200.

The first substrate 100 includes a first base substrate 110 made of a transparent insulating substrate. A gate line part including the first and second gate lines GLi and GLi−1, the first and second storage lines SLi and SLi−1, and first to fourth branch electrodes LSL1, RSL1, LSL2, and RSL2 (branched from first and second storage lines SLi and SLi−1) is disposed on the first base substrate 110.

The first substrate 100 includes a first insulating layer 121 to cover the gate line part, and a data line part including the first and second data lines DLj and DLj+1 and the voltage line VL is disposed on the first insulating layer 121. The data line part is covered by the second insulating layer 122, and a third insulating layer 123 is disposed on the second insulating layer 122.

The first sub-pixel electrode SPEa and the second sub-pixel electrode SPEb are disposed on the third insulating layer 123.

A fourth insulating layer 124 is disposed on the first sub-pixel electrode SPEa and the second sub-pixel electrode SPEb, and the third sub-pixel electrode SPEc and the fourth sub-pixel electrode SPEd are disposed on the fourth insulating layer 124.

The first substrate 100 further includes a first alignment layer 140 that covers the third sub-pixel electrode SPEc and fourth sub-pixel electrode SPEd.

The first alignment layer 140 may include a polymer material in which a decomposition, dimerization, or isomerization reaction of the polymer material occurs by irradiation of light, e.g., an ultraviolet ray or a laser. In addition, the first alignment layer 140 may include, for example, polymerized reactive mesogen.

The second substrate 200 includes a second base substrate 210 facing the first base substrate 110. A color filter layer 220 is disposed on the second base substrate 210, and the color filter layer 220 includes red, green, and blue color pixels R, G, and B.

The common electrode 230 is disposed on the color filter layer 220. The common electrode 230 faces the first sub-pixel electrode SPEa to form the first liquid crystal capacitor Clc1. Although not shown in figures, the common electrode 230 faces the second sub-pixel electrode SPEb to form the second liquid crystal capacitor Clc2. A second alignment layer is disposed on the common electrode 230.

The liquid crystal layer 300 includes the liquid crystal composition as described in the above-mentioned embodiment.

A method of manufacturing the liquid crystal display having the above-mentioned structure includes a process of forming the first and second alignment layers 140 and 240 through an exposure process using a reactive mesogen. The reactive mesogen may be included in the liquid crystal composition and then may be polymerized by using UV ray so as to form the first and second alignment layers 140 and 240. Alternatively, initial alignment layers which comprise the reactive mesogen may be formed on the first and second substrates 100 and 200 respectively, and then the initial alignment layers may be converted to the first and second alignment layers 140 and 240 by polymerization of the reactive mesogen using UV ray. In this case, the liquid crystal composition does not comprise the reactive mesogen. During the exposure process, an electric field is applied to the common electrode 230 and the third and fourth sub-pixel electrodes SPEc and SPEd. Accordingly, the vertical electric field is distorted by the first and second micro-slits US1 and US2 of the third and fourth sub-pixel electrodes SPEc and SPEd, so that a fringe electric field is formed. As described above, after the vertical electric field is distorted, the liquid crystal may be pre-tilted by polymerization reaction of the reactive mesogen. Then, the voltages are applied to the common electrode 230 and the first and second sub-pixel electrodes SPEa and SPEb to drive the liquid crystal display. That is, the third and fourth sub-pixel electrodes SPEc and SPEd are used in the electric field exposure process when the liquid crystal display is manufactured, and the first and second sub-pixel electrodes SPEa and SPEb are used when the liquid crystal display is normally driven. In this case, because the first and second sub-pixel electrodes SPEa and SPEb are each formed of a single plate, the vertical electric field may be formed between the common electrode and the first and second sub-pixel electrodes SPEa and SPEb without being distorted. In other words, the first and second sub-pixel electrodes SPEa and SPEb form the equipotential surface substantially parallel to the surface of the substrate between the common electrode 230 and the first and second sub-pixel electrodes SPEa and SPEb.

Accordingly, the liquid crystal display may easily pre-tilt the liquid crystal molecules in each domain by using the third and fourth sub-pixel electrodes. In addition, because the first and second sub-pixel electrodes form the electric field in cooperation with the common electrode, the vertical electric field is not distorted, and thus brightness distribution of the image may be uniform. Further, the response speed may be remarkably improved since no two-step motion occurs.

The liquid crystal display according to the exemplary embodiments may be used as not only a 2D image mode (2D mode) liquid crystal display but also a 3D image mode (3D mode) liquid crystal display because the liquid crystal display has a relatively fast driving speed. In particular, the liquid crystal display may be used as the 3D liquid crystal displays of various methods, such as a parallax barrier method which uses a light transmission area transmitting the light and a light blocking area blocking the light, a lenticular lens method which uses a plurality of lenses, a patterned retarder method which uses a patterned retarder polarizing the light to provide lights having different polarizing axes from each other, a shutter glass method, etc.

The parallax barrier method, the lenticular lens method, and the patterned retarder method may utilize a parallax barrier, a lenticular lens, and a patterned retarder, which are separately prepared, to display the 3D image, but the 3D image may be realized by a light converting unit, which is turned off in the 2D mode to transmit the light or turned on in the 3D mode to separate the light into a light for a left eye and a light for a right eye. The shutter glass method reproduces the 2D image in the 2D mode, and alternately closes or opens the left and right shutters in synchronization with the left and right eye images while the left and right eye images are sequentially reproduced by the liquid crystal display in the 3D mode.

In this case, the light converting unit is turned on or off to convert the image from the display panel to the 2D image or the 3D image. The light converting unit may include a liquid crystal layer interposed between two substrates, and controls the liquid crystal layer to be used as the parallax barrier, the lenticular lens, or the patterned retarder.

Figure 10:
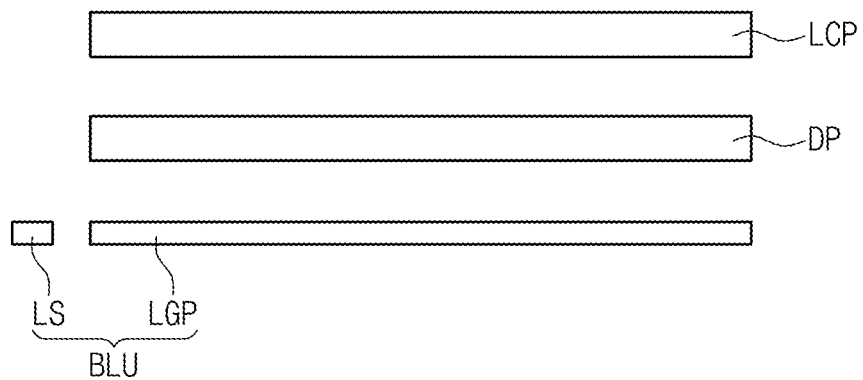
FIG. 10 is a cross-sectional view showing a liquid crystal display according to an exemplary embodiment.

FIG. 10 is a cross-sectional view showing a liquid crystal display according to an exemplary embodiment.

Referring to FIG. 10, the liquid crystal display includes a liquid crystal display panel DP having the above-mentioned structure, a backlight unit BLU providing the light to the liquid crystal display panel DP, and a light converting unit LCP disposed on the liquid crystal display panel DP.

The backlight unit BLU includes a light source LS emitting the light and a light guide plate LGP receiving the light and guiding the received light to the light converting unit LCP. As an example, the light source LS may include at least one light emitting diode and may be disposed adjacent to at least one side surface of the light guide plate LGP. The backlight unit BLU shown in FIG. 10 is an edge-illumination type, but the backlight unit BLU should not be limited to the edge-illumination type. That is, the backlight unit BLU may be, for example, a direct-illumination type.

Although not shown in FIG. 10, the light converting unit LCP includes a first substrate, a second substrate facing the first substrate, and a light converting liquid crystal layer interposed between the first substrate and the second substrate. A first electrode is disposed on the first substrate and a second electrode is disposed on the second substrate.

The light converting unit LCP is turned off in the 2D mode in which the 2D image is displayed to transmit the light from the liquid crystal display panel and output the light for the 2D image. Accordingly, the liquid crystal display displays the 2D image in the 2D mode. The light converting unit LCP is turned on when the liquid crystal display is in the 3D mode in which the 3D image is displayed. In this case, the liquid crystal layer serves as a liquid crystal lens (e.g., the lenticular lens), the parallax barrier, or the patterned retarder. Thus, the viewer may perceive the 3D image.

Although exemplary embodiments have been described, it is understood that embodiments should not be limited to these exemplary embodiments but various changes and modifications can be made by one ordinary skilled in the art within the spirit and scope of the present disclosure including the claims.

What is claimed is:
1. A liquid crystal display having a plurality of pixels, the liquid crystal display comprising:
   a first substrate that includes a first base substrate and a pixel electrode provided on the first base substrate in each of the pixels;
   a second substrate that includes a second base substrate facing the first base substrate and a common electrode provided on the second base substrate, the common electrode forming an electric field having an equipotential surface substantially parallel to an upper surface of the first base substrate in cooperation with the pixel electrode; and
   a liquid crystal layer disposed between the pixel electrode and the common electrode and including a liquid crystal composition having an anisotropic dielectric constant equal to or smaller than −2.9 or equal to or larger than −1.7,
   wherein the liquid crystal composition comprises:
   at least one first liquid crystal selected from the group consisting of compounds represented by the following Chemical formula 1;
   at least one second liquid crystal selected from the group consisting of compounds represented by the following Chemical formula 2;
   at least one third liquid crystal selected from the group consisting of compounds represented by the following Chemical formula 3;
   at least one fourth liquid crystal selected from the group consisting of compounds represented by the following Chemical formula 4; and
   at least one fifth liquid crystal selected from the group consisting of compounds represented by the following Chemical formula 5,

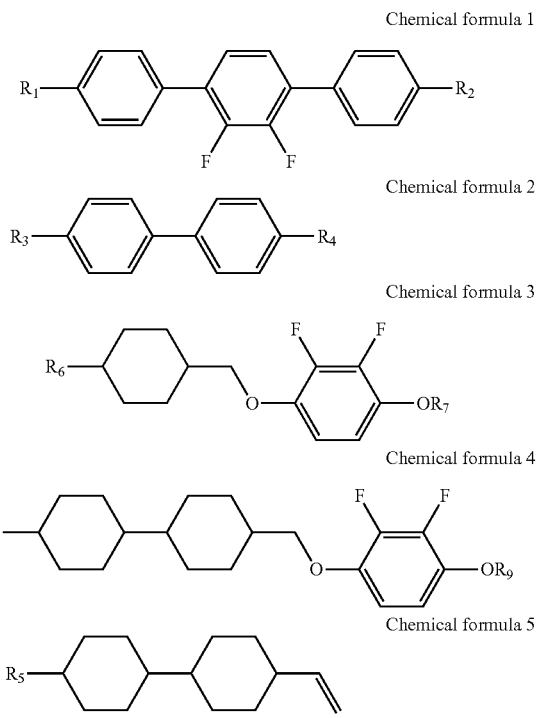

Chemical formula 1

Chemical formula 2

Chemical formula 3

Chemical formula 4

Chemical formula 5 where each of $R_1$ to $R_9$ is an alkyl group, an alkenyl group, or an alkoxy group, which contains 2 to 5 carbon atoms.

2. The liquid crystal display of claim 1, wherein the liquid crystal composition comprises about 14 to about 16 weight percent first liquid crystal, about 20 to about 24 weight percent second liquid crystal, about 15 to about 20 weight percent third liquid crystal, about 3 to about 10 weight percent fourth liquid crystal, and about 21 to about 27 weight percent fifth liquid crystal.

3. The liquid crystal display of claim 1, wherein the liquid crystal composition has an anisotropic refractive index equal to or larger than about 0.120.

4. The liquid crystal display of claim 1, wherein a distance between the pixel electrode and the common electrode is equal to or smaller than about 2.6 micrometers.

5. The liquid crystal display of claim 1, wherein the pixel electrode has a rectangular shape and comprises a first slit provided along at least a portion of an edge of the pixel electrode when viewed in a plan view.

6. The liquid crystal display of claim 5, wherein the first slit comprises a plurality of sub-slits and a connection portion is provided between ends of the sub-slits adjacent to each other.

7. The liquid crystal display of claim 6, wherein the connection portion is provided at at least one of a position corresponding to a corner of the rectangular shape or a position corresponding to a center of each side of the rectangular shape.

8. The liquid crystal display of claim 5, wherein the common electrode comprises a second slit provided in each of the pixels and substantially parallel to at least one side of the rectangular shape.

9. The liquid crystal display of claim 8, further comprising:
   a first alignment layer disposed on the first substrate and aligned in a first direction in each of the pixels; and
   a second alignment layer disposed on the second substrate to face the first alignment layer, the second alignment layer being aligned in a second direction different from the first direction in each of the pixels to form a plurality of domains in each of the pixels.

10. The liquid crystal display of claim 9, wherein the second slit is provided at a position corresponding to between the domains adjacent to each other when viewed in a plan view.

11. The liquid crystal display of claim 9, wherein each of the pixels comprises a first sub-pixel charged with a first voltage and including two or more domains and a second sub-pixel charged with a second voltage lower than the first voltage and including two or more domains, and the pixel electrode comprises a first sub-pixel electrode corresponding to the first sub-pixel and a second sub-pixel electrode corresponding to the second sub-pixel.

12. The liquid crystal display of claim 1, wherein the pixel electrode comprises:
   a first pixel electrode disposed on the first base substrate; and
   a second pixel electrode insulated from and overlapped with the first pixel electrode and including a plurality of micro-slits.

13. The liquid crystal display of claim 12, wherein the first pixel electrode comprises first and second sub-pixel electrodes electrically insulated from each other, and the second pixel electrode comprises a third sub-pixel electrode facing the first sub-pixel electrode with an insulating layer interposed therebetween and a fourth sub-pixel electrode facing the second sub-pixel electrode with the insulating layer interposed therebetween.

14. The liquid crystal display of claim 13, wherein the third sub-pixel electrode comprises a first trunk portion and a plurality of first branch portions extended from the first trunk portion and arranged in each domain to be substantially parallel to each other to define a plurality of first domains, and the fourth sub-pixel electrode comprises a second trunk portion and a plurality of second branch portions extended from the second trunk portion and arranged in each domain to be substantially parallel to each other to define a plurality of second domains.

15. The liquid crystal display of claim 14, wherein each of the first and second sub-pixel electrodes is formed in a single plate and forms the electric field together with the common electrode.

16. The liquid crystal display of claim 1, further comprising:
- a backlight unit that supplies a light to the liquid crystal layer; and
- a light converting unit disposed between the backlight unit and the first substrate or on the second substrate to convert the light to a light for a left eye and a light for a right eye.

17. The liquid crystal display of claim 16, wherein the light converting unit comprises a parallax barrier panel including a light transmission area transmitting the light and a light blocking area blocking the light, a lenticular panel including a plurality of lenses, or a patterned retarder polarizing the light to provide lights having different polarizing axes from each other.

18. The liquid crystal display of claim 16, wherein the light converting unit comprises:
- a first substrate;
- a second substrate facing the first substrate; and
- a light converting liquid crystal disposed between the first substrate and the second substrate, and the light converting unit is turned off in a 2D mode, in which a 2D image is displayed, to transmit the light and turned on in a 3D mode in which a 3D image is displayed.

* * * * *